(12) United States Patent
Nezarati et al.

(10) Patent No.: US 10,230,839 B2
(45) Date of Patent: Mar. 12, 2019

(54) SYSTEM AND METHOD OF PROVIDING SOCIAL CALLER ID AND CALLER RATING ON WEB CALLS

(71) Applicant: Avaya Inc., Santa Clara, CA (US)

(72) Inventors: Mohammad Nezarati, Richmond Hill (CA); Bryan Dingwall, Mississauga (CA)

(73) Assignee: Esna Technologies Inc., Richmond Hill, Ontario (CA)

(*) Notice: Subject to any disclaimer, the term of this patent is extended or adjusted under 35 U.S.C. 154(b) by 0 days.

(21) Appl. No.: 14/986,246

(22) Filed: Dec. 31, 2015

(65) Prior Publication Data

US 2016/0119470 A1 Apr. 28, 2016

Related U.S. Application Data

(62) Division of application No. 14/560,607, filed on Dec. 4, 2014.

(60) Provisional application No. 61/912,175, filed on Dec. 5, 2013.

(51) Int. Cl.
| | | |
|---|---|---|
| *H04M 3/42* | (2006.01) | |
| *H04M 1/56* | (2006.01) | |
| *H04L 29/06* | (2006.01) | |
| *H04L 29/08* | (2006.01) | |

(52) U.S. Cl.
CPC .... *H04M 3/42042* (2013.01); *H04L 65/1069* (2013.01); *H04L 65/608* (2013.01); *H04L 67/306* (2013.01); *H04M 3/42068* (2013.01)

(58) Field of Classification Search
USPC ............ 379/142.01, 207.15, 210.02, 201.02
See application file for complete search history.

(56) References Cited

U.S. PATENT DOCUMENTS

| | | | | |
|---|---|---|---|---|
| 7,240,290 | B2 * | 7/2007 | Melideo | G06Q 30/0256 |
| | | | | 379/93.23 |
| 8,958,537 | B1 | 2/2015 | Saylor | |
| 2006/0182243 | A1 * | 8/2006 | Yun | H04L 12/66 |
| | | | | 379/114.1 |
| 2009/0092237 | A1 | 4/2009 | Chang et al. | |
| 2009/0310768 | A1 | 12/2009 | Hansen et al. | |
| 2010/0015976 | A1 | 1/2010 | Issa et al. | |

(Continued)

OTHER PUBLICATIONS

Official Action for U.S. Appl. No. 14/560,607, dated Sep. 9, 2015 6 pages Restriction Requirement.

(Continued)

*Primary Examiner* — Quoc D Tran
(74) *Attorney, Agent, or Firm* — Sheridan Ross P.C.

(57) ABSTRACT

A method is provided for providing caller ID for a caller. An indication is received from a social networking site on which a caller has a profile that the caller has signed into the social networking site. A request is received from the caller to place a call to a callee. The system automatically associates at least one aspect of the caller's profile from the social networking site with the call request. The system then signals to the callee that there is a new call by displaying the call request with the at least one aspect of the caller's profile from the social networking site. A method is also provided for enhancing a callee's control over receiving a call. A method is also provided for facilitating web calling by a caller.

18 Claims, 9 Drawing Sheets

(56) References Cited

U.S. PATENT DOCUMENTS

| | | | |
|---|---|---|---|
| 2010/0144328 A1* | 6/2010 | Keating | H04L 67/306 |
| | | | 455/414.3 |
| 2010/0150327 A1 | 6/2010 | Belz et al. | |
| 2011/0014900 A1 | 1/2011 | Gottfried | |
| 2012/0196581 A1 | 8/2012 | Papakipos et al. | |
| 2012/0215848 A1 | 8/2012 | McCormick et al. | |
| 2013/0021951 A1* | 1/2013 | Altberg | G06Q 30/02 |
| | | | 370/261 |
| 2013/0051542 A1 | 2/2013 | Yao et al. | |
| 2013/0282417 A1* | 10/2013 | Gaedcke | G06Q 30/016 |
| | | | 705/7.13 |
| 2015/0103990 A1 | 4/2015 | Lee | |
| 2015/0163353 A1 | 6/2015 | Nezarati et al. | |

OTHER PUBLICATIONS

Official Action for U.S. Appl. No. 14/560,607, dated Dec. 30, 2015 8 pages.
Official Action for U.S. Appl. No. 14/560,607, dated Feb. 9, 2016 8 pages.
Official Action for U.S. Appl. No. 14/560,607, dated Jul. 11, 2016 9 pages.
Official Action for U.S. Appl. No. 14/560,607, dated Oct. 31, 2016 9 pages.
Notice of Allowance for U.S. Appl. No. 14/560,607, dated Apr. 19, 2017 5 pages.

\* cited by examiner

SYSTEM AND METHOD OF PROVIDING SOCIAL CALLER ID AND CALLER RATING ON WEB CALLS

CROSS-REFERENCE TO RELATED APPLICATIONS

This application is a division U.S. patent application Ser. No. 14/560,607, filed Dec. 4, 2014, which claims the benefit of U.S. Provisional Patent Application Serial No. 61/912,175, filed Dec. 5, 2013, the entire disclosures of which are hereby incorporated herein by reference.

FIELD OF INVENTION

The field of invention is generally related to real-time communications systems and in particular to real-time communications over the web.

BACKGROUND

The traditional telco caller ID is antiquated and does not provide adequate information about the caller. Existing solutions give little detail or indication as to who may be calling and are limited to caller ID/name or account names. Existing solutions for reaching an individual person with voice or video communications generally rely on large infrastructure within an organization or the user having dedicated and complicated setups.

Also lacking is an adequate solution allowing call recipients to rate system abusers or those who negatively utilize the system (i.e. crank callers, telemarketers and fax "spammers"), or to set preferences for handling different call sources i.e. public call versus internal call, corporate call versus personal call.

With the recent rise and proliferation of social media networks, the social graph comes into the spotlight. Today most social media networks are web-based and also provide means for people to interact with each other through e-mail, instant messaging, online chats etc. Social media networks allow people to share ideas, activities, events, and interests within their individual networks. Social media networks have a wealth of information about users and their connections in the form of a social graph. A social graph is a representation of the interconnection of relationships in an online social network. A social graph is a mapping of people and how they are related or connected to other people. The links between people in social networks are of different types; and the different types of relationships can be a friend, a co-worker, a family member, a classmate, a schoolmate etc.

Typically a social media network stores a representation of each person via a profile; each person's social connections and their interests. Profiles often have a section dedicated to comments from friends and other users. To protect user privacy, social networks typically have controls that allow users to choose who can view their profile, contact them, add them to their list of contacts, and so on.

Given this wealth of information being available about the user on social media network(s), it would be desirable to utilize this information when users are calling or being called.

SUMMARY

Broadly speaking, the invention provides a system and method that allows a user to create a WebCallingAlias, using which other users (callers) may be able to reach the callee (user who created the WebCallingAlias). The caller may be a registered user of the system or may not be a registered user.

A WebCallingAlias can be used to facilitate calling the user. The present system and method leverages existing web and browser technology protocols e.g. WebRTC, HTML5 to make a broadly compatible solution that is easily accessed by users. For example, the caller and callee may be connected using WebRTC. The end points or devices where a call may be originated and a call may be terminated may include but are not limited to a traditional phone (POTS), PSTN, PBX, Smartphone, tablet, PC, any internet connected device capable of voice or video call, or other type of messaging.

The WebCallingAlias may be augmented with the social profile of a user and the system may acquire this information from the social media network(s) that a user prefers e.g. Facebook, Linkedin, Google+. With the proliferation of social network profiles, the association of these details enables receivers of such calls to make more informed decisions and take appropriate actions.

A user may be able to set calling preferences as to which device is to be called, and set presence and availability preferences and privacy preferences as to who can reach them using the WebCallingAlias.

The system and method may also provide a mechanism for a user to have multiple WebCallingAliases. A user may opt to use each WebCallingAlias in a different scenario e.g. one WebCallingAlias that can be embedded in an e-mail signature and enables specific "corporate" flow of communications in terms of reachability and priority; while another WebCallingAlias that can be published on a public website as a directory calling link.

A user may be able to embed the WebCallingAlias as a WebLink in an e-mail so that any recipient of that e-mail may be able to click on the WebCallingAlias and start a communications session e.g. a voice call with the user. Similarly a user may be able to embed the WebCallingAlias in an e-mail signature, a web page, an SMS, an IM message etc.

In one embodiment the contact lists of other users of the system are automatically updated with the WebCallingAlias of those users who have newly created it or have modified it.

One embodiment incorporates a "social rating" system that aims to provide extra information about the caller. The rating system may be shared among other system users and may help prevent abuse by enabling correct identifications of user account types i.e. organization, individual, etc. The rating mechanism may allow a callee to rate a caller as a spammer, a telemarketer, a sales agent etc.

In one embodiment a caller's social profile and rating are acquired from the social media network(s) and the system as the call is being established between the caller and the callee. The call may be a voice call, a video call, SMS, IM or other form of communications. If callee is busy or does not accept the call from the caller, then the system and method of invention allows a caller to leave a message, and in case the caller chooses not to leave a message, a missed call notification is displayed to the callee along with the social profile and the rating of the caller.

Without limiting the solution to enterprise users, the solution aims to provide a voice and/or video WebCallingAlias that enables a callee to be reached by the other users of the system, or the general public; while also enabling reliable identification of the caller. Thus the system and method enables an individual user (e.g. a consumer) to subscribe to and utilize/manage the WebCallingAlias for themselves. While it also enables corporate signups for an organization to deploy the system to corporate end users as a "directory" service for their organization with pre-defined WebCallingAliases.

According to a first aspect of the invention, a method is provided for providing caller ID for a caller. An indication is received from a social networking site on which a caller has a profile that the caller has signed into the social networking site. A request is received from the caller to place a call to a callee. (Note that the request may precede logging in to the social networking site, or vice versa.) At least one aspect of the caller's profile from the social networking site is automatically associated with the call request. A signal is provided to the callee that there is a new call. The call request is displayed with the at least one aspect of the caller's profile from the social networking site (i.e. in the form of a WebCallingAlias, as referred to elsewhere in this disclosure).

The at least one aspect of the caller's profile may be accessed from the social networking site itself directly, or it may be accessed from a local database (having previously been cached, for example). The caller need not have logged into the social networking site expressly for the purpose of placing a call. The system may detect or have accessed or stored aspects of the caller's profile from a previous login unrelated to the call.

Except where context expressly specifies otherwise, the term "social networking site" or "social network" is used herein to refer to both traditional social networking sites (e.g. Facebook, LinkedIn, Twitter, Google+, etc.) where users sign on for the express purpose of networking socially with other users, as well as, other third party services or websites that provide a means for identifying unique users out of a userbase with individual profiles (e.g. Gmail, Outlook, specific interest and directory websites, etc.) whether or not used expressly for networking or connecting socially or professionally.

In one embodiment, the request is triggered by selection of the callee from the social networking site. For example, the caller may be able to search for the callee on the social networking site prior to making the request.

The at least one aspect of the profile may be various things, e.g. an image or a photo associated with the caller, and/or a name, username, nickname, or alias of the caller.

If no connection is made with the callee, the caller may be allowed to leave a message for the callee. The system provides a notifier to the callee that there is a message waiting, which includes the at least one aspect of the caller's profile from the social networking site.

In the event of a missed call, the system may provide a missed call notifier to the callee, which includes the at least one aspect of the caller's profile from the social networking site.

After the call, the callee may be allowed to rate the caller with a rating. This may be stored in association with the caller's profile. The rating may be compiled with other ratings of that caller from other callees to form an aggregate rating. In one embodiment, the aggregate rating is displayed with future call requests from that caller.

According to a second aspect of the invention, a method is provided for enhancing a callee's control over receiving a call. An interface is provided by which a callee can set at least one rule to designate certain individuals or categories of individuals from whom the callee wishes to receive a call. These designated individuals or categories may be based on the callee's contacts in a social networking site. When a request is received from a caller to place a call to the callee, the system automatically determines whether the caller is one of the designated individuals or in one of the designated categories. If so, the call is permitted to be connected, and the call is identified to the callee by displaying at least one aspect of the caller's profile from the social networking site.

In one embodiment, the category is a minimum aggregate rating of a caller (or a rating category or status, e.g. spam, telemarketer, sales agent, etc.).

The at least one rule may also be time- or date-dependent. The callee may also specify for a call to be routed to a specific device associated with the callee in the at least one rule.

According to a third aspect of the invention, a method is provided for facilitating web calling by a caller. An interface is provided whereby a callee can associate at least one aspect of the callee's profile from a social networking site with the callee's phone number or calling address. A link (such as a web-accessible link) can be created for the callee, the appearance of which includes the at least one aspect of the callee's profile. The callee is then enabled to paste or embed the link into an email or a web page, such that actuation of the link by a caller will initiate a web call to the callee's phone number or calling address.

"Web calling" and "web call" in the present context simply refer to any non-PSTN initiated call, including but not limited to voice or video calls over WebRTC, and including app-to-app calls.

Preferably, the link is stored with the callee's profile. Preferably, the link is updated automatically as the callee's profile on the social networking site is updated.

The method may further enable the callee to provide a photo or the system may acquire a photo of the callee (e.g. using the callee's device camera) for association with the callee's phone number or calling address.

In one embodiment, the web call is a voice or video call over WebRTC.

The invention may also be embodied in a system. For example, a system may be provided for providing caller ID for a caller. A caller ID generating module may be provided for reviewing a profile of a social networking site at which the caller has a profile, and selecting at least one aspect of the profile to form a WebCallingAlias for the caller. A call routing module may also be provided for receiving a request from the caller to place a call to a callee, and displaying the caller's WebCallingAlias to the callee when the call is placed.

DETAILED DESCRIPTION

Figure 1:
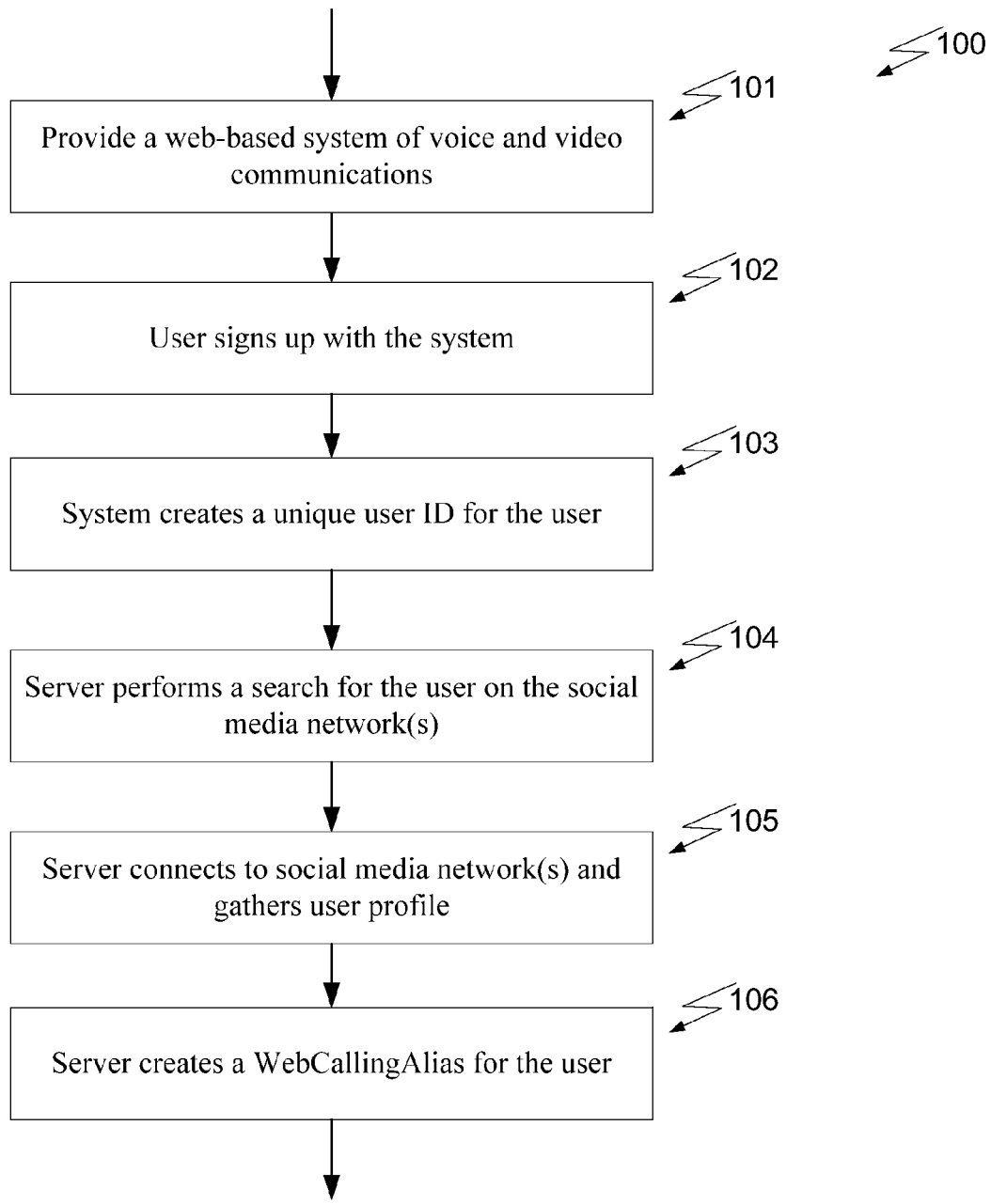
FIG. 1 is a flow diagram illustrating creation of a WebCallingAlias according to an aspect of the present invention.

Before embodiments are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation.

It should also be understood that many components and items are illustrated and described as if they were hardware elements, as is common practice within the art. However, in at least one embodiment, the components of the method and system are actually implemented in software.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. LAMP (Linux, Apache, MySQL and PHP) is an example of a well-known open-source Web development platform. Other examples of environments and frameworks using which computer code may also be generated are Ruby on Rails which is based on the Ruby programming language, or node.js which is an event-driven server-side JavaScript environment.

In a preferred embodiment the program code may execute entirely on the server (or a cluster of servers), partly on a server and partly on a user's computer, as a stand-alone software package, partly on the user's computer and partly on a remote computer or entirely on the remote computer or server. In the latter scenario, the remote computer may be connected to the user's device e.g. a Smartphone through any type of network, including a local area network (LAN) or a wide area network (WAN), or the connection may be made to an external computer (for example, through the Internet using an Internet Service Provider).

A device that enables a user to engage with an application using the invention, including a memory for storing a control program and data, and a processor (CPU) for executing the control program and for managing the data, which includes user data resident in the memory and includes buffered content. The computer may be coupled to a video display such as a television, monitor, or other type of visual display while other devices may have it incorporated in them (iPad). An application or a game or other simulation may be stored on a storage media such as a DVD, a CD, flash memory, USB memory or other type of memory media or it may be downloaded from the internet. The storage media can be inserted to the device where it is read. The device can then read program instructions stored on the storage media and present a user interface to the user. The code is specialized to execute functions described herein which enable a smoother and more efficient technological process. It should be noted that the terms computer, device, smartphone etc. have been used interchangeably but imply any device that allows a user to access the social network and social graph.

FIG. 1 is a flow diagram of certain overarching concepts of one embodiment of the method 100. The system provides web based system of voice and video communications 101. In a preferred embodiment the system and method provide a mechanism to enable voice and video communications on traditional phones (PSTN), PBX, Smartphones, tablets, computers, PC and other connected devices.

In a preferred embodiment, the voice or video session may be established between end devices using technologies like WebRTC which include the fundamental building blocks for communications on the web such as network, audio and video components used in voice and video chat applications. These components, when implemented in a browser, allow access the camera and microphone, enables sets up of audio and video calls as well allows web browsers to share data via peer-to-peer.

The PSTN (Public Switched Telephone Network) is the aggregate of the world's circuit-switched telephone networks that are operated by national, regional, or local telephony operators, providing infrastructure and services for public telecommunication. The PSTN consists of telephone lines, fiber optic cables, microwave transmission links, cellular networks, communications satellites, and undersea telephone cables, all interconnected by switching centers, thus allowing any telephone in the world to communicate with any other. Originally a network of fixed-line analog telephone systems, the PSTN is almost entirely digital in its core and includes mobile as well as fixed telephones.

A PBX (Private Branch Exchange) is a telephone exchange that serves a particular business or office, as opposed to one that a common carrier or telephone company operates for many businesses or for the general public. PBXs make connections among the internal telephones of a private organization, usually a business, and also connect them to the PSTN via trunk lines. Because they incorporate telephones, fax machines, modems, and more, the general term "extension" is used to refer to any end point on the branch.

Traditionally text messaging is referred to sending and receiving short text messages using the Short Message Service (SMS). Text messaging is the act of typing and sending a brief, electronic message between two or more mobile phones or fixed or portable devices over a phone network. It has grown to include messages containing image, video, and sound content, known as Multi-media Messaging (MMS).

Instant messaging is a set of communication technologies used for text-based communication between two or more participants over the Internet or other types of networks. IM-chat happens in real-time. Online chat and instant messaging differ from other technologies such as email as they are real time communications by the users. Some systems permit messages to be sent to users not they are off line, by sending the message to the associated email account.

The user signs up with the system 102. Signing up to a system is well known in the art and may require a user to provide their credentials, a user name and a password.

The system creates a unique user ID for the user 103. A unique user ID is provided to each user so that each user can be identified uniquely in the system and the calls, messages, other notification may be correctly routed to their devices as per their preferences.

The server performs a search for the user on the social media networks 104. A social media network is an online service or a platform or a website that provides the means for people to build their social networks reflecting their social relationships with other people.

Facebook, Twitter, LinkedIn and Google+ are examples of the most popular social media networks. Social media networks share a variety of technical features. The most basic of these are visible profiles usually with a list of "friends" who are also users of the site. Some social media networks allow people to upload pictures, add multimedia content to uniquely individualize the look and feel of their profiles. Facebook even allows people to enhance their profiles by adding modules or applications.

The server connects to a social media network(s) and gathers a user profile 105. Connectivity is exemplified by using Facebook as an example. Other social media networks also provide well documented APIs for connectivity and access to user information.

In one embodiment a social media network provides a social graph. For example Facebook offers a social graph that represents people and the connections they have to other people or things that they may care about. A social graph is a representation of the interconnection of relationships in an online social network. In mathematics a graph is an abstraction for modeling relationships between things. A graph consists of nodes and edges, or things and the ways that these things relate to each other. A social graph is a mapping of people and how they are related or connected to other people. In a social graph, each person is a node. There is an explicit connection, if two people know each other, for example, two people can be connected because they work together or because they went to school together or because they are married. The links between people in social networks are of different types; and the different types of relationships can be a friend, a co-worker, a family member, a classmate, a schoolmate etc.

Facebook offers a well documented and established API, the Graph API, which presents a simple, consistent view of the Facebook social graph, uniformly representing objects in the graph (e.g., people, photos, events, and pages) and the connections between them (e.g., friend relationships, shared content, and photo tags). The Graph API as such allows a developer/application to access all public information about an object. The Graph API allows an application to read properties and connections of the Facebook social graph. A developer can use the API to read specific fields, get pictures of any object, introspect an object for metadata and get real-time updates on any changes.

Facebook Platform uses the OAuth 2.0 protocol for authentication and authorization and supports two different OAuth 2.0 flows for user login: server-side (also known as the authentication code flow) and client-side (also known as the implicit flow). The server-side flow is used whenever an application needs to call the Graph API from its web server. The client-side flow is used whenever an application needs to make calls to the Graph API from a client, such as JavaScript running in a Web browser or from a native mobile or desktop application.

By default, a user is asked to authorize the application to access basic information that is available publicly or by default on Facebook. If an application needs more than this basic information to function, it must request specific permissions from the user. This is accomplished by adding a scope parameter to the OAuth Dialog request followed by comma separated list of the required permissions.

An application can access people and pages with usernames, where their username is an ID. Getting an access token for a user with no extended permissions allows an application to access the information that the user has made available to everyone on Facebook. If an application needs specific information about a user, like their email address or work history, it must ask for the specific extended permissions. The reference documentation for each Graph API object contains details about the permissions an application needs to access each connection and property on that object.

With a valid access token an application can invoke the Graph API by appending the access token parameter to Graph API requests. If the user changes their password, the access token expires. An application can request a new access token by re-running the appropriate process.

Every object in the social graph has a unique ID. A developer can access the properties of an object by sending a secure request using the URL https://graph.facebook.com/ID. Additionally, people and pages with usernames can be accessed using their username as an ID. All responses to these requests are sent as JSON objects.

All of the objects in the Facebook social graph are connected to each other via relationships. A developer can examine the connections between objects using the URL structure https://graph.facebook.com/ID/CONNECTION_TYPE. The Facebook Query Language (FQL) object enables running FQL queries using the Graph API. Facebook Query Language enables a developer to use an SQL-style interface to query the data exposed by the Graph API. It provides for some advanced features not available in the Graph API, including batching multiple queries into a single call.

friendlist
Query this table to return any friend lists owned by the specified user.
friendlist_member
Query this table to determine which users are members of a friend list.

The server creates a WebCallingAlias for the user 106. In one embodiment a user receives a suggested WebCallingAlias from the server. The user can also opt to create a more unique alias if they prefer.

A mechanism may also be provided for a user to create multiple WebCallingAliases. For example one WebCallingAlias may be for embedding in the user's e-mails while another may be for displaying on a public website. Each WebCallingAlias may have its own unique preferences.

One embodiment may preferably include a management interface allowing a user or organization to setup the user accounts for the WebCallingAlias via a web page or a console, or other such method either for themselves or on behalf of other individuals.

The management interface may preferably include but is not limited to providing mechanisms for allowing the setting up of preferences for sources of calls, minimum required ratings, allowed social identifiers (e.g. restricting to LinkedIn only for corporate users). The management interface may include pre-defining rule sets and availability settings for calls to a user or a group of users (e.g. a call center administrator may enable calling to the users of the system only between business hours and not on holidays). The management interface may include mechanisms for the enablement of remittance of payment(s) for services with one time, repeated subscription or other payment models.

Figure 2:
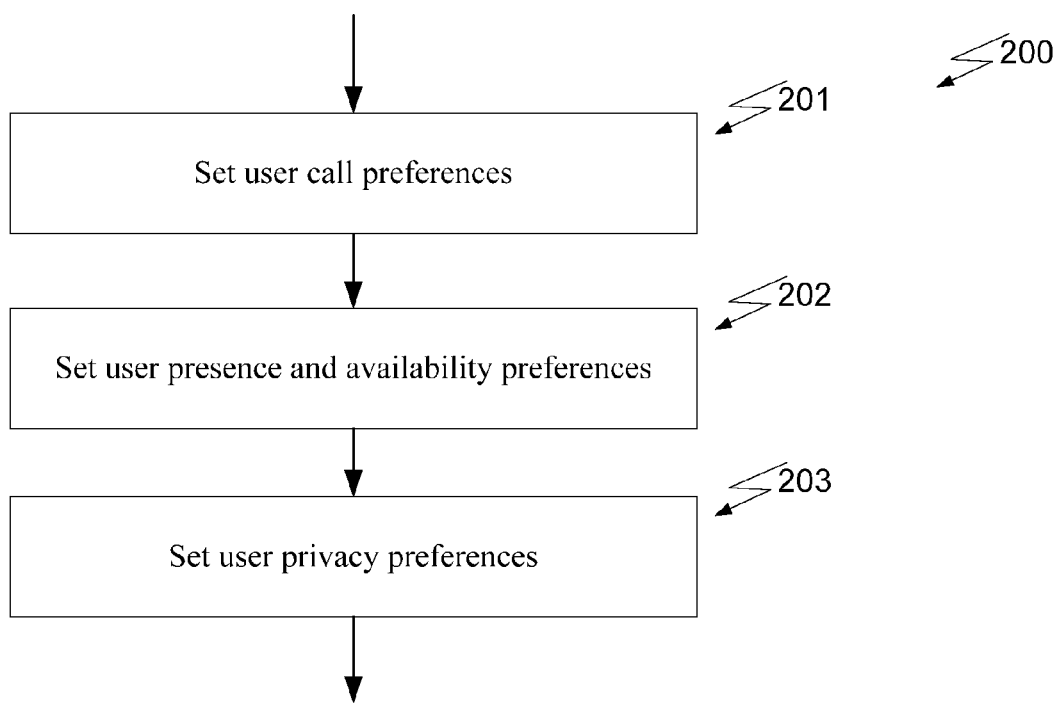
FIG. 2 is a flow diagram illustrating setting user preferences.

FIG. 2 shows one embodiment 200 where a user can set different preferences for the WebCallingAlias, e.g. user call preferences 201. The user may be allowed to define these preferences via a user interface, on when and how calls will be delivered to the user. Call preferences in this context imply where the user may want to receive calls. Since most people have multiple devices where they receive voice, video or text communications, the user may be allowed to define which communications are routed to which devices. Thus for example a user may opt to receive phone calls from 9:00 am to 5:00 pm on the user's office number, while on the road receive calls on the user's mobile device and at night and weekends receive calls on the user's home number.

In one embodiment, a user may be able to define multiple end points in these preferences including a mobile phone, personal computing systems, or plain old telephone service (POTS) phones, as well as other types of end devices as well as other types of end devices capable of voice, video, text or other type of communications.

The user can also set user presence and availability preferences 202. Presence refers to the ability to detect the electronic presence of other users who are connected to the Internet, through a PC or mobile device, and whether they are available in real time. Presence information has wide applications in many communication services and are commonly used in applications like instant messaging clients, and discussion forums, VoIP clients etc.

Presence is a status indicator that conveys ability and willingness of a potential communication partner. A user's client provides presence information (presence state) via a network connection to a presence service, which is stored in what constitutes his personal availability record and can be made available for distribution to other users to convey the availability for communication.

The user can also set user privacy preferences 203 regarding who can see the user's presence and the granularity of the user's presence, collectively privacy options.

In one embodiment call settings and preferences may preferably be automatically defined based on a user's calendar events (Outlook or Google Calendar events). For example, when a user is in a meeting with other colleagues, the user can opt to send calls to voicemail.

In another embodiment call settings may be defined based on the physical location of the user, e.g. gathering the location of the user via mobile location services and/or GPS. For example when a user is at the golf course, the user can opt to send calls to voicemail.

In yet another embodiment call settings may be defined based the device behaviour e.g. detecting physical orientation of a device and if the device is face up, letting the call through, while if the device is face down sending the call to voicemail. In another example a user's engagement on a device e.g. user idleness at desktop determines how a call is handled.

In one embodiment there may be default settings and a user may opt to either accept these default settings or may opt to modify these settings for personalization to suit their needs. A user may define more than one end point (e.g. a PC or a Mobile device) on which they may prefer to receive their communications.

One embodiment may preferably include predictive logic based on the behaviour and actions taken by a callee in the past. For example if a callee has rejected or sent a call to voicemail several times in the past, (chances are they do not wish to talk to the caller) so automatically reject the call going forward. The system may provide an option for a callee to confirm or undo predictive logic acquired as a result of the callee actions or behaviour. The system may also provide an option to request social feedback rating from the callee on their repeated actions or behaviour i.e. why did the callee reject the call from a particular caller repeatedly.

In case of multiple WebCallingAliases, a user may be required to carry out this process multiple times.

Figure 3:
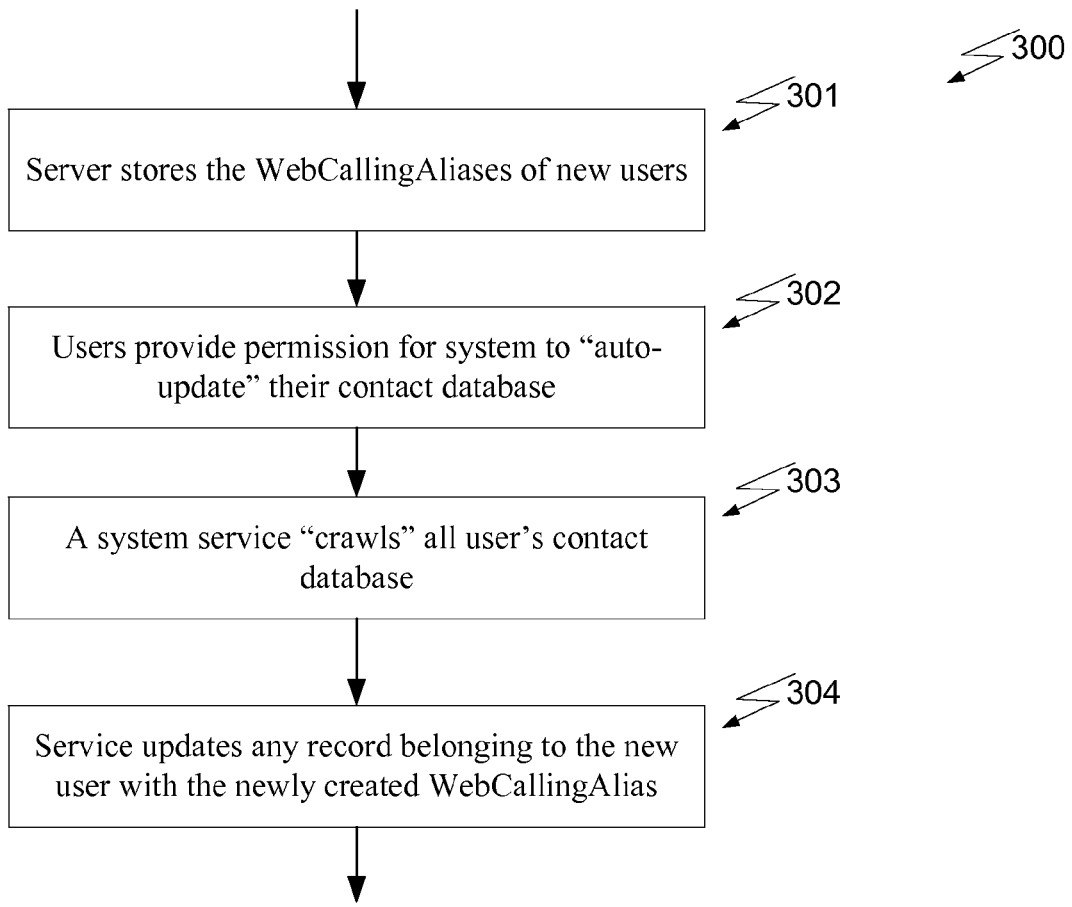
FIG. 3 is a flow diagram illustrating integration with user contact databases.

FIG. 3 shows one embodiment 300 showing automatic updating of user contact lists with the newly created WebCallingAlias(es). The server stores the WebCallingAlias of new users 301. New WebCallingAliases may be stored in a database.

Users may provide permission for the system to "auto-update" their contact database 302.

A system service "crawls" all user's contact database 303. The service updates any record belonging to the new user with the newly created WebCallingAlias (es) 304.

Figure 4:
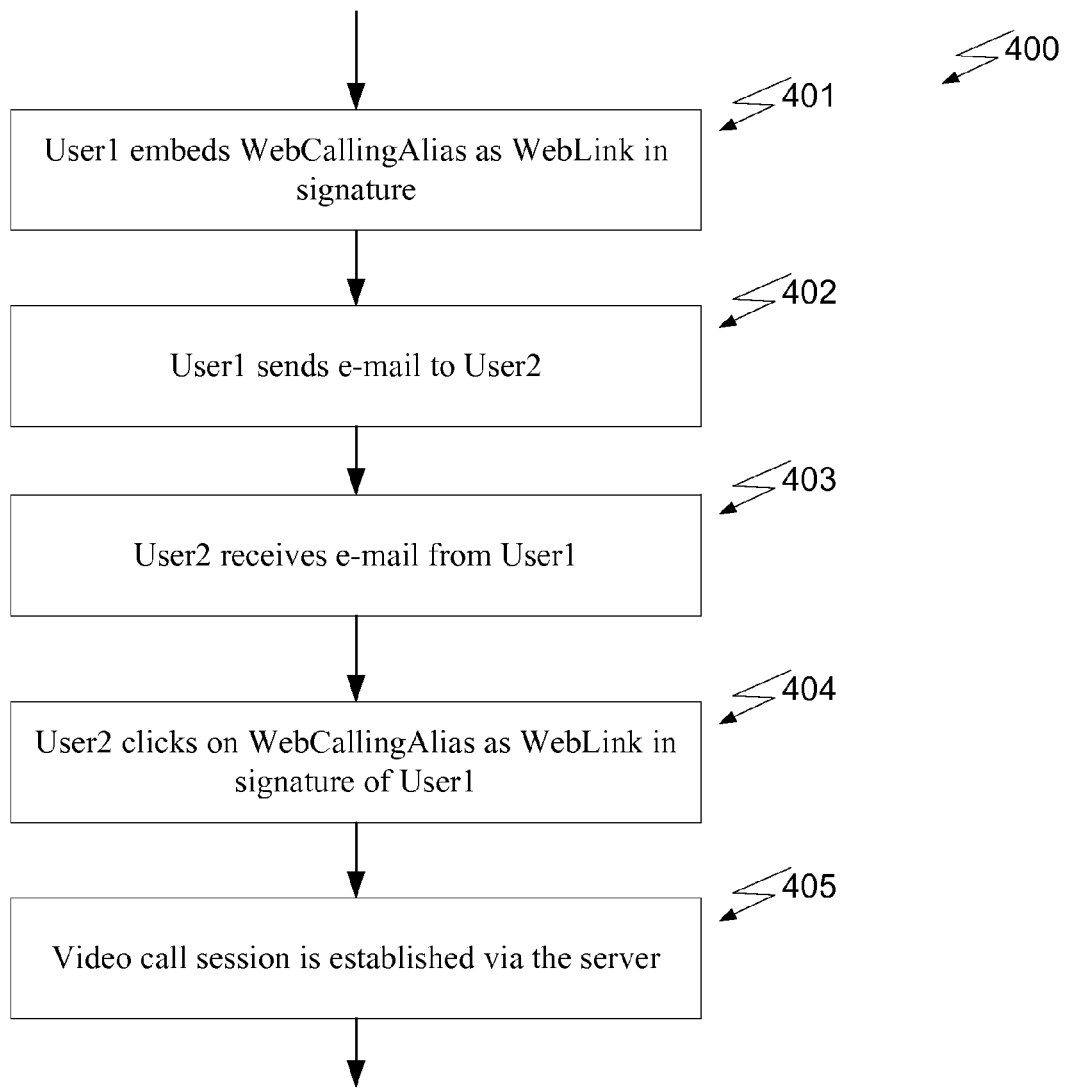
FIG. 4 is a flow diagram illustrating embedment of a WebCallingAlias in an email signature and initiating a call from the embedded link.

FIG. 4 shows one embodiment 400. User1 embeds WebCallingAlias as a WebLink in the user's signature 401. HTML offers many of the conventional publishing idioms for rich text and structured documents, including hypertext and interactive documents. The WebLink, hyperlink or link is a basic hypertext construct. The default behavior associated with a link is the retrieval of another Web resource; which may be any Web resource e.g., an image, a video clip, a sound bite, a program, an HTML document, an element within an HTML document, etc.

In e-mail and other electronic text communications a signature or signature block allows users to set one or more lines of custom text known to be automatically appended to their messages. A signature is a block of text that is appended to the end of an e-mail message you send. Generally, a signature is used to provide the recipient with the senders name, e-mail address, business contact information, or website. The signature can include text or graphic images.

User1 sends an e-mail to User2 402. User2 may or may not be a registered user of the system.

User2 receives an e-mail from User1 403. When User2 clicks on WebCallingAlias as WebLink in signature of User1 404, a video call session may be established via the server 405. In another embodiment the call session may be a voice call.

The voice or video session may be established using technologies like WebRTC. WebRTC is an open source project that enables web browsers with Real-Time Communications (RTC) capabilities using JavaScript APIs. It includes the fundamental building blocks for communications on the web such as network, audio and video components used in voice and video chat applications. These components, when implemented in a browser, can be accessed through a Javascript API, enabling developers to implement their own RTC web app. Major components of WebRTC include:

GetUserMedia: allows a web browser to access the camera and microphone

PeerConnection: enables sets up audio/video calls

DataChannels: allows web browsers to share data via peer-to-peer

One embodiment may include parallel real time services along with the video and voice communication session including but not limited to text based chat e.g. instant messaging (IM), screen or content (presentation) sharing, launching access to cooperative or independent third party applications (for example remote assistance) etc.

Figure 5:
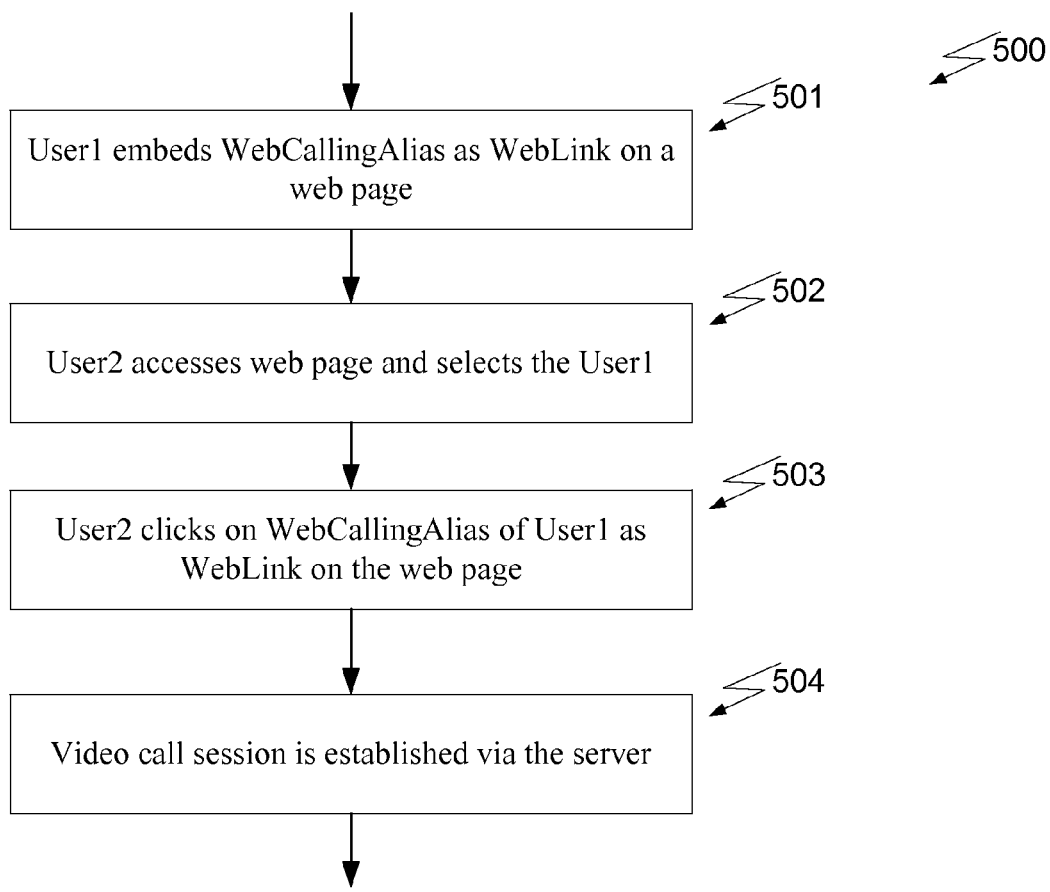
FIG. 5 is a flow diagram illustrating embedment of a WebCallingAlias on a web page and initiating a call from the embedded link.

FIG. 5 shows one embodiment 500. User1 embeds his WebCallingAlias as WebLink on a web page 501.

User2 accesses the web page and selects User1 502. User2 may or may not be a registered user of the system.

When User2 clicks on WebCallingAlias of User1 as a WebLink on the web page 503, a video call session may be established via the server 504. Alternatively, the call may be a voice call over PSTN.

Figure 6:
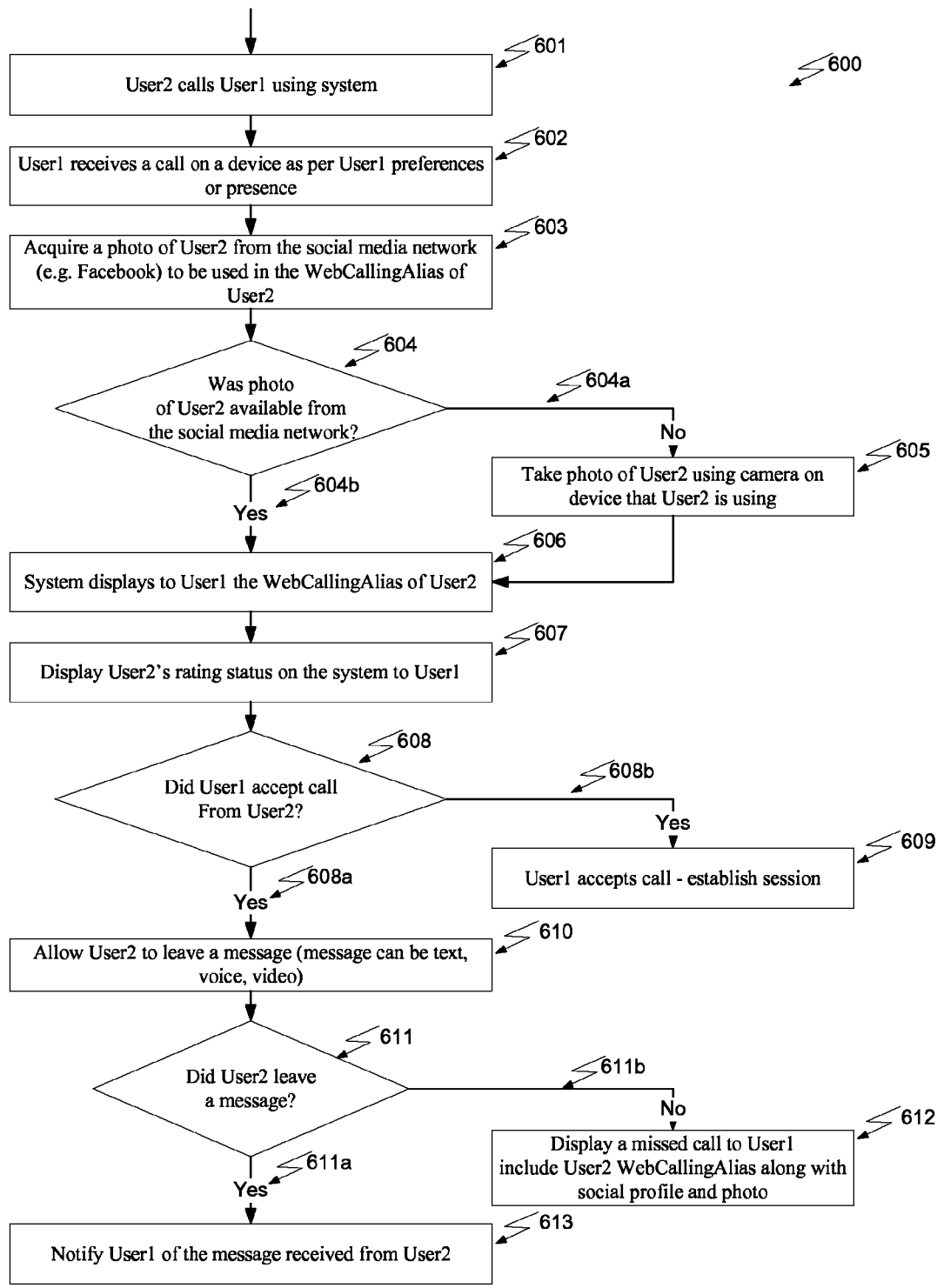
FIG. 6 is a flow diagram illustrating process for acquiring a photograph and a rating status for the user and subsequent call process.

FIG. 6 shows one embodiment 600. User2 calls User1 using the system 601.

User1 receives a call on a device as per User1 preferences or presence 602.

The system may acquire a photo of User2 from the social media network e.g. Facebook to be used in the WebCallingAlias of User2 603. In one embodiment LinkedIn is preferably used for corporate and enterprise user while Facebook is used for consumers (individual users).

The system may check if a photo of User2 is available from the social media network 604. If No 604a, no photo of User2 is available from the social media network, then the system may take a photo of User2 using a camera on the device that User2 is using e.g. a Smartphone or a tablet 605.

If Yes 604b, a photo of User2 is available from the social media network, then the system displays to User1 the WebCallingAlias of User2 along with the photo of User2 606.

The system may also display User2's rating status (if available) on the system to User1 607.

The system checks if User1 accepted the call from User2 608. If Yes 608b, User1 accepted the call from User2, then the system establishes a call session between devices of User1 and User2 609.

If No 608a, User1 did not accept the call from User2, then User2 may be allowed to leave a message 610. The message can be video, voice, text, multimedia or other.

The system may check if User2 left a message 611. If No 611b, User2 did not leave a message for User1, then the system may display a missed call to User1 and include User2's WebCallingAlias along with aspects of his social profile and his photo 612.

If Yes 611a, User2 did leave a message for User1, then the system may notify User1 of the message received from User2 613. The message received/message waiting notification may be but is not necessarily limited to a visual indication e.g. a flashing light, text, or an auditory indication e.g. several short beeps, or both visual and auditory indications.

Figure 7A:
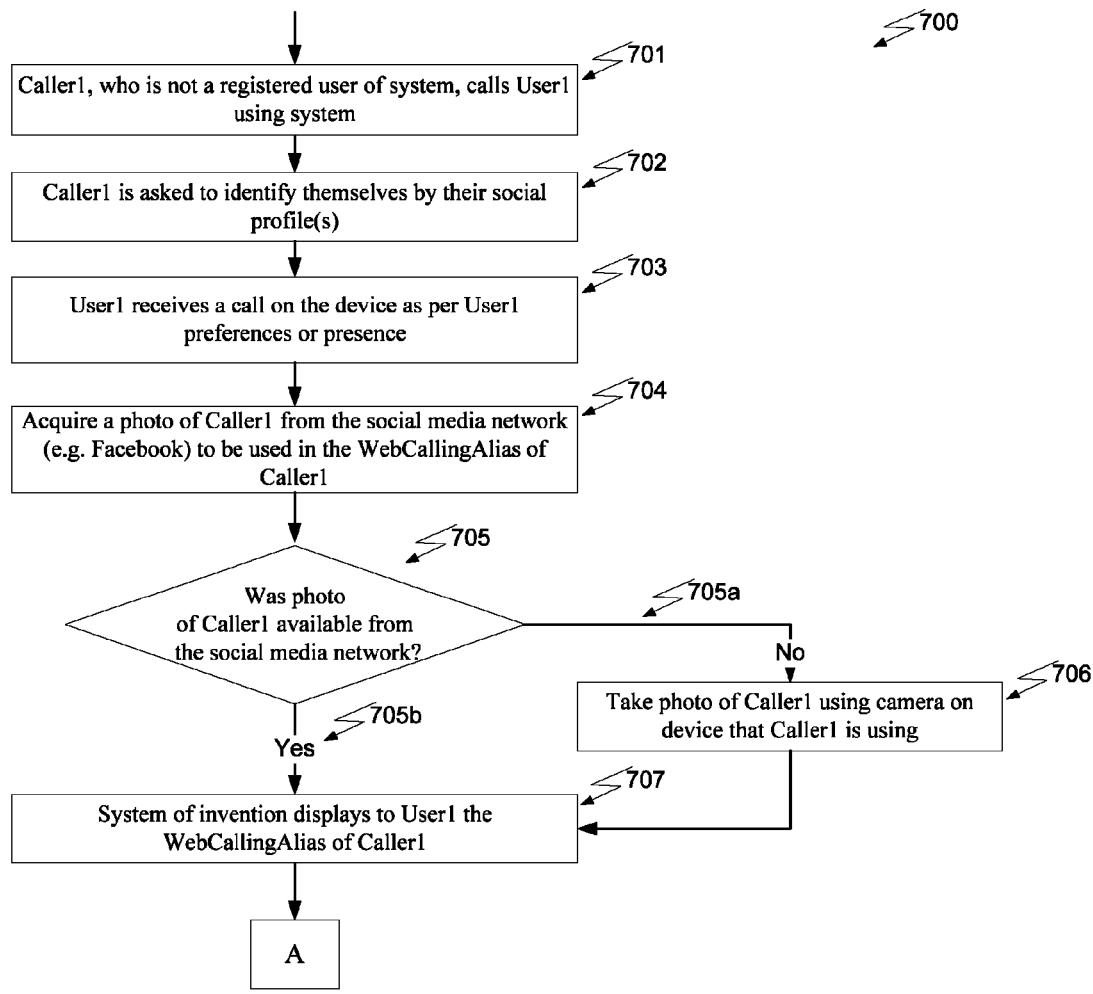
FIG. 7a is a flow diagram illustrating sample call process from Caller1 to User1.
Figure 7B:
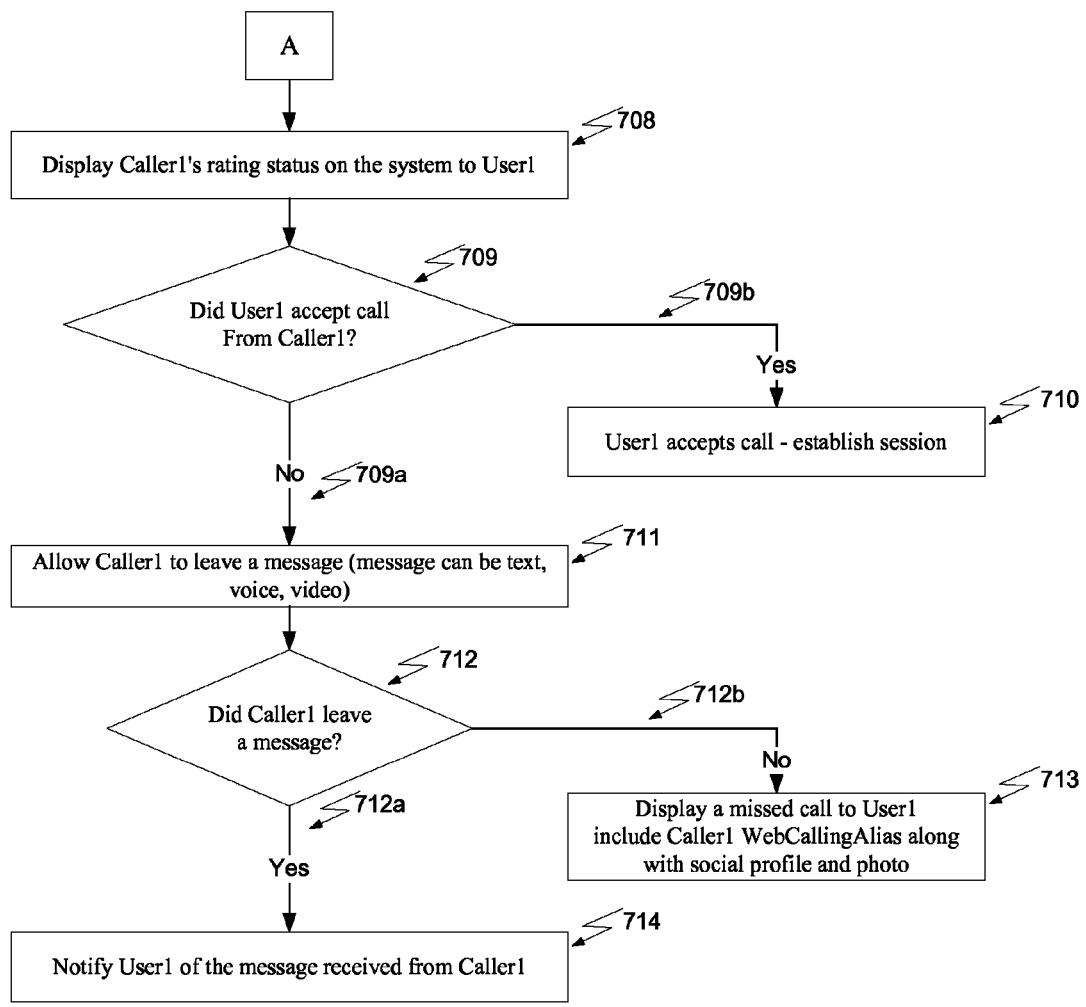
FIG. 7b is a flow diagram illustrating connecting a call from Caller1 to User1 (following the process in FIG. 7a).

Turning to another embodiment as shown in FIGS. 7a and 7b, Caller1, who is not a registered user of system of invention, may call User1 using system 701.

Caller1 is asked to identify themselves by their social profile(s) 702.

User1 receives a call on a device as per User1 preferences or presence 703.

The system may acquire a photo of Caller1 from a social media network e.g. Facebook to be used in the WebCallingAlias of Caller1 704.

The system checks whether a photo of Caller1 is available from the social media network 705. If No 705a, no photo of Caller1 is available from the social media network, then the system may take a photo of Caller1 using a camera on the device that Caller1 is using e.g. a Smartphone or a tablet 706.

If Yes 705b, a photo of Caller1 is available from the social media network, then the system displays to User1 the WebCallingAlias of Caller1 along with the photo of Caller1 707.

Caller1's rating status (if available) may also be displayed on the system to User1 708.

The system checks whether User1 accepted the call from Caller1 709. If Yes 709b, User1 accepted the call from Caller1, then the system establishes a call session between devices of User1 and Caller1 710.

If No 710a, User1 did not accept the call from Caller1, then the system may allow Caller1 to leave a message 711. The message can be video, voice, text, multimedia or other.

The system may check whether Caller1 left a message 712. If No 712b, Caller1 did not leave a message for User1, then the system may display a missed call to User1 and include Caller1's WebCallingAlias along with his social profile, photo and rating 713.

If Yes 712a, Caller1 did leave a message for User1, then the system may notify User1 of the message received from Caller1 714. The message received/message waiting notification may be but is not necessarily limited to a visual indication e.g. a flashing light, text, or an auditory indication e.g. several short beeps, or both visual and auditory indications.

Figure 8:
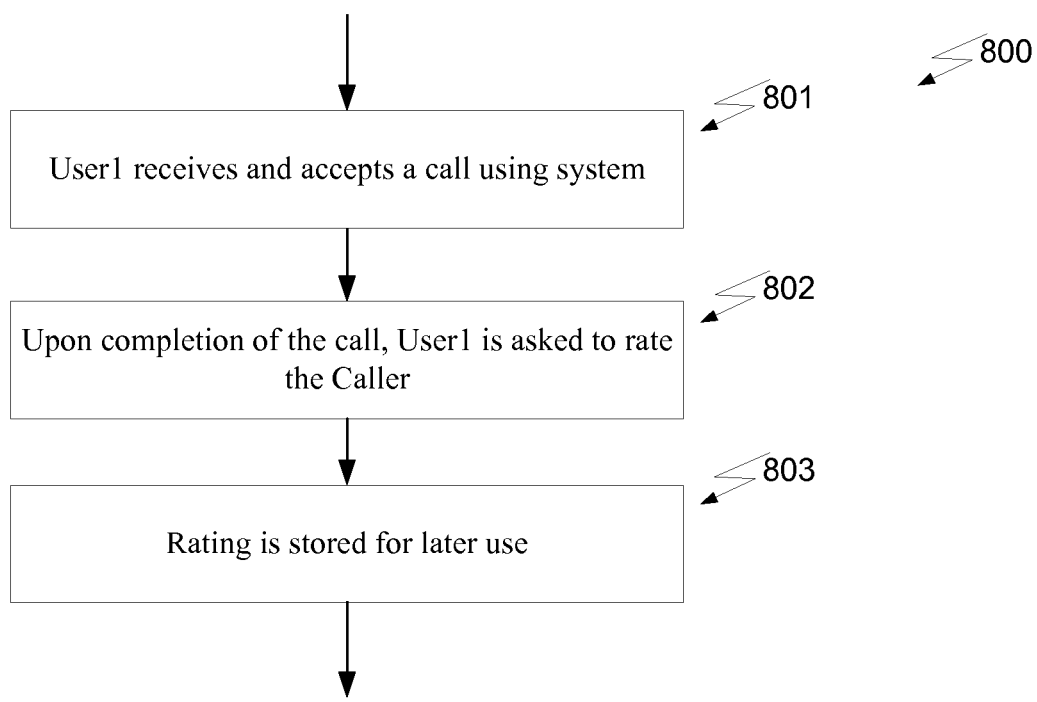
FIG. 8 is a flow diagram illustrating post-call rating.

FIG. 8 shows a rating mechanism 800. The rating mechanism is used to help other users by sharing ones experience with the caller. Caller ratings may include but are not limited to telemarketer, spammer, etc.

The social nature of the internet has enabled the valuable use case of being able to source "community" reviews and opinions of various products, events, locations and more. People generally trust the opinions of their friends, peers, and associates and an individual is more likely to choose a product, result, destination, etc. based on recommendations from these groups. This enables invoking the analogy of "community social trust" that is leveraged for platforms such as Yelp, TripAdvisor, Google Reviews, etc. where the opinions of the community are leveraged in helping individuals make decisions.

User1 receives and accepts a call using system 801. Devices where User1 may receive the call from the Caller may include a traditional phone (POTS), PSTN, PBX, Smartphone, tablet, PC, any internet connected device capable of voice or video call, or other type of messaging. Such devices may be running any number of different operating systems as diverse as Microsoft Windows family, MacOS, iOS, any variation of Google Android, any variation of Linux or Unix, PalmOS, Symbian OS, Ubuntu or such operating systems used for such devices available in the market today or the ones that will become available as a result of the advancements made in such industries.

Upon completion of the call, User1 may be asked to rate the Caller 802. Instructions for performing the rating may be provided by a user via an input to a touchscreen, a mouse, a keyboard, a stylus, a voice controlled user interface, and other such methods that may be familiar to the ones skilled in the art. One embodiment may use events as a trigger to initiate the rating process.

Another embodiment may use rules for rating. There may be some system defined base rules, and a user may also be able to add more rules to suit their needs for rating. The rating of the caller may also depend on the context and profiles.

The rating may be stored by the system for later use 803. In one embodiment a mechanism for the rating of a caller is provided along with the WebSocialCaller ID. The feedback received from callees about callers from whom they have received calls, forms a part of the WebSocialCaller "community social trust". This enables positive and trusted callers to be easily enabled with communication, even when communicating with persons unknown to that user. Additionally negative ratings from callees enables in the reduction of abuse of the system for purposes such as harassment, telemarketing, etc.

In one embodiment the WebCallingAlias(es) of user(s), their social profiles and ratings may be made available to other applications or services. This may be achieved by providing an API to this aggregated information so that other applications may also easily access this information.

Devices where invention can be advantageously used may include but not limited to a personal computer (PC), which may include but not limited to a home PC, corporate PC, a Server, a laptop, a Netbook, tablet computers, a Mac, touch-screen computers running any number of different operating systems e.g. MS Windows, Apple iOS, Google Android, Linux, Ubuntu, etc. a cellular phone, a Smartphone, a PDA, an iPhone, an iPad, an iPod, an iPad, a PVR, a settop box, wireless enabled Blu-ray player, a TV, a SmartTV, wireless enabled connected devices, e-book readers e.g. Kindle or Kindle DX, Nook, etc. and other such devices that may be capable of text, voice and video communications. Other embodiments may also use devices like Samsung's Smart Window, Google Glasses, Corning's new glass technologies, and other innovations and technologies that may be applicable to the invention at present or in the future.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

It should be understood that although the term application has been used as an example in this disclosure but in essence the term may also imply to any other piece of software code where the embodiments are incorporated. The software application can be implemented in a standalone configuration or in combination with other software programs and is not limited to any particular operating system or programming paradigm described here.

Several exemplary embodiments/implementations have been included in this disclosure, but the intent is to cover all such areas that may benefit from the present system and method.

The above examples are not intended to be limiting, but are illustrative and exemplary.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A method of facilitating web calling by a caller, comprising:
    searching one or more social media network sites for information associated with a callee;
    in response to finding a first web page on a first social media site associated with the callee, providing an interface whereby the callee can associate at least one aspect of the callee's profile provided by the first social media site with the callee's phone number or calling address; and
    embedding a link for the callee, with the aspect of the calle's profile, into the first web page associated with the callee and associated with the first social media site, the appearance of the link including the at least one aspect of the callee's profile, such that actuation of the link by the caller initiates a web call to the callee's phone number or calling address and the caller is provided the first web page when searching for the callee.

2. The method of claim 1, wherein the link is a web-accessible link.

3. The method of claim 1, wherein the link is stored with the callee's profile.

4. The method of claim 3, wherein the link is updated automatically as the callee's profile on the first social media site is updated.

5. The method of claim 1, further comprising enabling the callee to provide a photo or acquiring a photo of the callee for association with the callee's phone number or calling address.

6. The method of claim 1, wherein the web call is a voice or video call over WebRTC.

7. A non-transitory computer readable medium having instructions stored thereon to conduct a method of facilitating web calling by a caller, the method comprising:
    searching one or more social media network sites for information associated with a callee;
    in response to finding a first web page on a first social media site, providing an interface whereby the callee can associate at least one aspect of the callee's profile provided by the first social media site with the callee's phone number or calling address; and
    embedding a link for the callee, with the aspect of the callee's profile, into the first web page, associated with the callee and associated with the first social media site, wherein the appearance of the link includes the at least one aspect of the callee's profile, such that actuation of the link by the caller initiates a web call to the callee's phone number or calling address, and the caller is provided the first web page when searching for the callee.

8. The non-transitory computer readable medium of claim 7, wherein the link is a web-accessible link.

9. The non-transitory computer readable medium of claim 7, wherein the link is stored with the callee's profile.

10. The non-transitory computer readable medium of claim 9, wherein the link is updated automatically as the callee's profile on the first social media site is updated.

11. The non-transitory computer readable medium of claim 10, further comprising enabling the callee to provide a photo or acquiring a photo of the callee for association with the callee's phone number or calling address.

12. The non-transitory computer readable medium of claim 10, wherein the web call is a voice or video call over WebRTC.

13. A computing system comprising:
a memory;
a processor in communication with the memory, the processor to
search one or more social media network sites for information associated with a callee;
in response to finding a first web page on a first social media site, provide an interface whereby the callee can associate at least one aspect of the callee's profile provided by the first social media site with the callee's phone number or calling address; and
embed a link for the callee, with the aspect of the callee's profile, into the web page, associated with the callee and associated with the first social media site, the appearance of the link including the at least one aspect of the callee's profile, such that actuation of the link by a caller initiates a web call to the callee's phone number or calling address, wherein the caller is provided the first web page when searching for the callee.

14. The computing system of claim 13, wherein the link is a web-accessible link.

15. The computing system of claim 13, wherein the link is stored with the callee's profile.

16. The computing system of claim 15, wherein the link is updated automatically as the callee's profile on the first social media site is updated.

17. The computing system of claim 16, further comprising enabling the callee to provide a photo or acquiring a photo of the callee for association with the callee's phone number or calling address.

18. The computing system of claim 16, wherein the web call is a voice or video call over WebRTC.

* * * * *

UNITED STATES PATENT AND TRADEMARK OFFICE
CERTIFICATE OF CORRECTION

PATENT NO. : 10,230,839 B2
APPLICATION NO. : 14/986246
DATED : March 12, 2019
INVENTOR(S) : Mohammad Nezarati and Bryan Dingwall It is certified that error appears in the above-identified patent and that said Letters Patent is hereby corrected as shown below:

In the Claims

At Column 14, Line 26, please delete "calle's" and replace it with --callee's-- therein.

Signed and Sealed this
Seventh Day of May, 2019

Andrei Iancu
*Director of the United States Patent and Trademark Office*